US012781021B2

(12) United States Patent
Iwasaki et al.

(10) Patent No.: US 12,781,021 B2
(45) Date of Patent: Nov. 3, 2026

(54) MODIFYING AGENT FOR POLYOLEFIN RESINS AND POLYOLEFIN RESIN COMPOSITION CONTAINING SAID MODIFYING AGENT

(71) Applicant: NEW JAPAN CHEMICAL CO., LTD., Kyoto (JP)

(72) Inventors: Shohei Iwasaki, Kyoto (JP); Kazuya Matsumoto, Kyoto (JP); Yurie Takei, Kyoto (JP); Takahiro Inoue, Kyoto (JP); Sukehiro Niga, Kyoto (JP); Ken-ichi Miyazaki, Kyoto (JP)

(73) Assignee: NEW JAPAN CHEMICAL CO., LTD., Kyoto (JP)

( * ) Notice: Subject to any disclaimer, the term of this patent is extended or adjusted under 35 U.S.C. 154(b) by 714 days.

(21) Appl. No.: 17/912,742

(22) PCT Filed: Mar. 22, 2021

(86) PCT No.: PCT/JP2021/011568

§ 371 (c)(1),
(2) Date: Sep. 19, 2022

(87) PCT Pub. No.: WO2021/193484

PCT Pub. Date: Sep. 30, 2021

(65) Prior Publication Data

US 2023/0174742 A1 Jun. 8, 2023

(30) Foreign Application Priority Data

Mar. 24, 2020 (JP) ................................ 2020-052568

(51) Int. Cl.

| | |
|---|---|
| ***C08K 3/34*** | (2006.01) |
| ***C08K 9/04*** | (2006.01) |
| ***C09C 1/28*** | (2006.01) |

(52) U.S. Cl.

CPC .................. *C08K 3/34* (2013.01); *C08K 9/04* (2013.01); *C09C 1/28* (2013.01); *C08K 2201/005* (2013.01)

(58) Field of Classification Search

CPC ...... C08K 3/34; C08K 9/04; C08K 2201/005; C08K 5/092; C08K 2003/2237; C08K 2003/265; C09C 1/28; C08L 23/12

See application file for complete search history.

(56) References Cited

U.S. PATENT DOCUMENTS

| | | | | |
|---|---|---|---|---|
| 2002/0102404 | A1 | 8/2002 | Nakai et al. | |
| 2010/0010168 | A1 | 1/2010 | Wolfschwenger et al. | |
| 2010/0151172 | A1 | 6/2010 | Emig et al. | |
| 2010/0317779 | A1 | 12/2010 | Pham et al. | |
| 2018/0163014 | A1* | 6/2018 | Tinkl | C08K 9/04 |

FOREIGN PATENT DOCUMENTS

| | | | | | |
|---|---|---|---|---|---|
| CN | 101605749 | A | | 12/2009 | |
| CN | 101687949 | A | | 3/2010 | |
| CN | 102428139 | A | | 4/2012 | |
| CN | 102648239 | A | | 8/2012 | |
| CN | 103896776 | A | * | 7/2014 | C07C 69/75 |
| CN | 106397988 | A | | 2/2017 | |
| CN | 108219295 | A | | 6/2018 | |
| JP | 2001234060 | A | * | 8/2001 | |
| JP | 2002-235015 | A | | 8/2002 | |
| JP | 2004-525227 | A | | 8/2004 | |
| JP | 2004-300188 | A | | 10/2004 | |
| JP | 2007-161954 | A | | 6/2007 | |

(Continued)

OTHER PUBLICATIONS

Aramaki, JP2001234060-MT (Year: 2001).*

(Continued)

*Primary Examiner* — Robert S Jones, Jr.
*Assistant Examiner* — Zhen Liu
(74) *Attorney, Agent, or Firm* — WHDA, LLP

(57) ABSTRACT

The invention relates to a modifying agent for polyolefin resins, comprising a calcium-containing inorganic filler whose particle surface is treated with an alicyclic dicarboxylic acid represented by formula (1) and/or formula (2); a polyolefin resin composition comprising the modifying agent for polyolefin resins; and a polyolefin resin molded article comprising the composition.

(1)

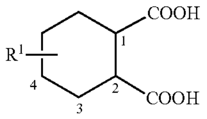

(In formula (1), $R^1$ is a $C_1$-$C_4$ alkyl group, and $R^1$ binds to the carbon at position 3 or 4 of a cyclohexane ring.)

(2)

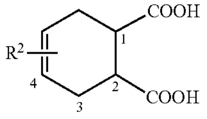

(In formula (2), $R^2$ is a hydrogen atom or a $C_1$-$C_4$ alkyl group, and $R^2$ binds to the carbon at position 3 or 4 of a cyclohexene ring.)

12 Claims, No Drawings

(56) References Cited

FOREIGN PATENT DOCUMENTS

| | | | | |
|---|---|---|---|---|
| JP | 2016-503373 | A | 2/2016 | |
| JP | 2017-518399 | A | 7/2017 | |
| JP | 2017-528575 | A | 9/2017 | |
| JP | 2017-210597 | A | 11/2017 | |
| WO | 02/078924 | A2 | 10/2002 | |
| WO | WO-2011061096 | A1 * | 5/2011 | ................ C08J 5/18 |
| WO | 2014/060286 | A1 | 4/2014 | |
| WO | 2015/158758 | A1 | 10/2015 | |
| WO | 2016/042306 | A1 | 3/2016 | |

OTHER PUBLICATIONS

Luan, CN103896776-MT (Year: 2014).*

Beck, J of Applied Polymer Science—vol. 11, Issue5 May 1967 pp. 673-685 (Year: 1967).*

Office Action dated Jul. 15, 2023, issued in counterpart CN Application No. 202180022244.8, with English translation. (20 pages).

International Search Report dated Jun. 1, 2021, issued in counterpart International application No. PCT/JP2021/011568, with English translation. (6 pages).

Tabtiang et al., "The performance of selected unsaturated coatings for calcium carbonate filler in polypropylene", European Polymer Journal, 2000, vol. 36, pp. 137-148, cited in ISR dated Jun. 1, 2021. (12 pages).

"Kobunshi Rombunshu", Japanese Journal of Polymer Science and Technology, 1995, vol. 52, No. 8, pp. 491-495, cited in Specification. (6 pages).

* cited by examiner

MODIFYING AGENT FOR POLYOLEFIN RESINS AND POLYOLEFIN RESIN COMPOSITION CONTAINING SAID MODIFYING AGENT

TECHNICAL FIELD

The present invention relates a calcium-based modifying agent for polyolefin resins, a polyolefin resin composition comprising the modifying agent, and a polyolefin resin molded article obtained by using the resin composition as a raw material.

BACKGROUND ART

Polyolefin resins, such as polyethylene and polypropylene, are inexpensive and have well-balanced performance, and are thus used as general-purpose plastics in a variety of applications. In particular, polyolefin resins are easily molded and achieve excellent mechanical performance, such as elasticity and rigidity, of the resulting molded products, and are thus widely used in the fields of automotive components, electrical or electronic components, precision machinery components, etc.

With recent technological advances in those fields, even higher rigidity (e.g., flexural modulus) and higher heat resistance (e.g. heat distortion temperature) are required for the molded products used for automotive components, electrical or electronic components, precision machinery components, etc. In general, typical known methods for increasing the rigidity and heat resistance of thermoplastic resins, such as polyolefin resins, include a method comprising blending a filler, such as calcium carbonate, talc, mica, and glass fibers, with a resin; these methods have been widely used.

For crystalline resins, such as polyolefin resins, known methods for improving the rigidity and heat resistance also include a method comprising blending a crystal nucleating agent of, for example, an inorganic compound, such as talc, or an organic compound, such as a diacetal compound, a metal salt of a phosphoric acid ester, or a metal salt of a carboxylic acid or sulfonic acid, with a resin to improve the crystallinity; this method has been widely used.

Recently, the technology to combine the filler with the crystal nucleating agent to attempt obtaining higher rigidity and heat resistance has also been studied. For automotive components etc., this technology has already been put into practical use. For example, when a crystal nucleating agent, such as a metal salt of a phosphoric acid ester, is added to a resin containing a conventional inorganic filler, such as talc, the blending amount of the inorganic filler is reduced, enabling weight reduction of automotive components etc., which is said to be effective in, for example, reducing fuel consumption. Additionally, a method comprising performing surface treatment of an inorganic filler with a crystal nucleating agent to achieve an even better effect has also been reported (e.g., Patent Literature (PTL) 1 and Non-patent Literature (NPT) 1).

In recent years, however, there have been significant advances in applications for automotive components and electrical or electronic components, and higher rigidity and heat resistance are coming to be also required for molded products used for these components. However, the conventional methods described above do not always satisfy these requirements at present.

CITATION LIST

Patent Literature

PTL 1: JP2007-161954A

Non-Patent Literature

NPL 1: Japanese Journal of Polymer Science and Technology, 52(8), 491-496(1995)

SUMMARY OF INVENTION

Technical Problem

An object of the present invention is to provide a modifying agent for polyolefin resins capable of providing, when blended with a polyolefin resin, a polyolefin resin molded article having absolutely excellent mechanical performance and heat resistance. Another object of the present invention is to provide a polyolefin resin composition comprising the modifying agent for polyolefin resins and having absolutely excellent mechanical performance and heat resistance, and provide a polyolefin resin molded article comprising the composition.

Solution to Problem

To achieve the above objects, the present inventors conducted extensive research and consequently found that surface treatment of a calcium-containing inorganic filler with an alicyclic dicarboxylic acid having a specific structure produces a modifying agent in which a calcium salt of the alicyclic dicarboxylic acid adheres to the surface of the inorganic filler, and that such a modifying agent has an absolutely excellent nucleating agent effect on polyolefin resins. The inventors then confirmed that polyolefin resin molded products comprising the modifying agent have remarkably improved mechanical performance and heat resistance. After further research based on these findings, the present invention has been accomplished.

More specifically, the present invention relates to the following modifying agent for polyolefin resins having an excellent nucleating agent effect, polyolefin resin composition comprising the modifying agent for polyolefin resins and having absolutely excellent mechanical performance and heat resistance, and polyolefin resin molded article comprising the composition.

[1] A modifying agent for polyolefin resins, comprising a calcium-containing inorganic filler whose particle surface is treated with an alicyclic dicarboxylic acid represented by formula (1) and/or formula (2):

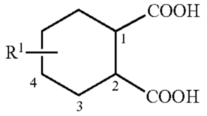

(1)

wherein $R^1$ is a $C_1$-$C_4$ alkyl group, and $R^1$ binds to the carbon at position 3 or 4 of a cyclohexane ring; and

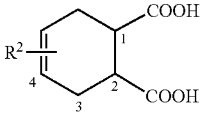

(2)

wherein $R^2$ is a hydrogen atom or a $C_1$-$C_4$ alkyl group, and $R^2$ binds to the carbon at position 3 or 4 of a cyclohexene ring.

[2] The modifying agent for polyolefin resins according to Item [1], wherein the calcium-containing inorganic filler is at least one member selected from the group consisting of calcium carbonate, calcium silicate, calcium titanate, and calcium sulfate.

[3] The modifying agent for polyolefin resins according to Item [1] or [2], wherein the calcium-containing inorganic filler is calcium silicate.

[4] The modifying agent for polyolefin resins according to any one of Items [1] to [3], wherein the calcium-containing inorganic filler has an average particle size of 0.1 to 20 μm.

[5] The modifying agent for polyolefin resins according to any one of Items [1] to [4], wherein in formula (1), $R^1$ is a methyl group or a tert-butyl group.

[6] The modifying agent for polyolefin resins according to any one of Items [1] to [5], wherein in formula (1), the content of an isomer in which $R^1$ and two carboxyl groups on the cyclohexane ring all have a cis configuration is 70 mol % or more of total stereoisomers.

[7] The modifying agent for polyolefin resins according to any one of Items [1] to [6], wherein in formula (2), two carboxyl groups on the cyclohexene ring have a cis configuration.

[8] The modifying agent for polyolefin resins according to any one of Items [1] to [7], wherein the alicyclic dicarboxylic acid is an alicyclic dicarboxylic acid represented by formula (1).

[9] The modifying agent for polyolefin resins according to any one of Items [1] to [8], wherein the amount of the alicyclic dicarboxylic acid adhering to the surface of the particles of the calcium-containing inorganic filler is 0.2 mol or more per mole of the calcium contained in the modifying agent for polyolefin resins.

[10] A polyolefin resin composition comprising the modifying agent for polyolefin resins of any one of Items [1] to [9] and a polyolefin resin.

[11] The polyolefin resin composition according to Item [10], comprising the modifying agent for polyolefin resins in an amount of 3 to 40 parts by mass per 100 parts by mass of the polyolefin resin.

[12] A polyolefin resin molded article comprising the polyolefin resin composition of Item [10] or [11].

[13] A method for producing the modifying agent for polyolefin resins of any one of Items [1] to [9], the method comprising treating the surface of particles of a calcium-containing inorganic filler with an alicyclic dicarboxylic acid represented by formula (1) and/or formula (2).

[14] A method for producing the polyolefin resin composition of Item [10] or [11], the method comprising treating the surface of particles of a calcium-containing inorganic filler with an alicyclic dicarboxylic acid represented by formula (1) and/or formula (2) to obtain a modifying agent for polyolefin resins, and blending the obtained modifying agent for polyolefin resins with a polyolefin resin.

Advantageous Effects of Invention

The modifying agent for polyolefin resins of the present invention, when blended with a polyolefin resin, greatly improves mechanical performance, such as rigidity, and heat resistance, such as a heat distortion temperature, of the resulting molded products. This makes weight reduction possible by making the molded product thinner in applications for automotive components, electrical components, etc. Further, even in applications in which the use of polyolefin resins has so far been difficult due to their performance, and other resins, such as expensive ABS, would thus be inevitably used, the use of a general-purpose polyolefin resin, which is inexpensive and has excellent recyclability, is made possible in place of those other resins. Accordingly, the present invention is very useful in developing molded products for a variety of purposes.

DESCRIPTION OF EMBODIMENTS

1. Modifying Agent for Polyolefin Resins

The modifying agent for polyolefin resins of the present invention is characterized by comprising a calcium-containing inorganic filler whose surface is treated with a specific alicyclic dicarboxylic acid. That is, the modifying agent is characterized in that a calcium salt of the alicyclic dicarboxylic acid adheres to the surface of the calcium-containing inorganic filler. This modifying agent has an absolutely excellent nucleating agent effect on polyolefin resins.

Alicyclic Dicarboxylic Acid

The specific alicyclic dicarboxylic acid is an alicyclic dicarboxylic acid represented by formula (1) or formula (2) below:

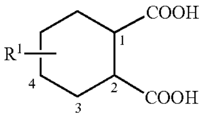

(1)

wherein $R^1$ is a $C_1$-$C_4$ alkyl group, and $R^1$ binds to the carbon at position 3 or 4 of a cyclohexane ring; and

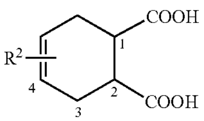

(2)

wherein $R^2$ is a hydrogen atom or a $C_1$-$C_4$ alkyl group, and $R^2$ binds to the carbon at position 3 or 4 of a cyclohexene ring.

$R^1$ in formula (1) is a $C_1$-$C_4$ linear or branched alkyl group. Specific examples include methyl, ethyl, n-propyl, isopropyl, n-butyl, isobutyl, sec-butyl, and tert-butyl. Among these, methyl and tert-butyl groups are particularly recommended, for example, from the viewpoint of crystallization-improving effect.

The substitution position of $R^1$ in formula (1) is position 3 or position 4 of the cyclohexane ring. Substitution at either position is possible. A particularly preferred substitution position is appropriately selected according to the type of the alkyl group as the substituent.

Specific embodiments of the alicyclic dicarboxylic acid represented by formula (1) include 3-methylcyclohexane-1,2-dicarboxylic acid, 3-ethylcyclohexane-1,2-dicarboxylic acid, 3-n-propylcyclohexane-1,2-dicarboxylic acid, 3-isopropylcyclohexane-1,2-dicarboxylic acid, 3-n-butylcyclohexane-1,2-dicarboxylic acid, 3-tert-butylcyclohexane-1,2-dicarboxylic acid, 3-isobutylcyclohexane-1,2-dicarboxylic acid, 4-methylcyclohexane-1,2-dicarboxylic acid, 4-ethylcyclohexane-1,2-dicarboxylic acid, 4-n-propylcyclohexane-1,2-dicarboxylic acid, 4-isopropylcyclohexane-1,2-dicarboxylic acid, 4-n-butylcyclohexane-1,2-dicarboxylic acid, 4-tert-butylcyclohexane-1,2-dicarboxylic acid, and 4-isobutylcyclohexane-1,2-dicarboxylic acid. Among these, preferred embodiments include 3-methylcyclohexane-1,2-dicarboxylic acid, 4-methylcyclohexane-1,2-dicarboxylic acid, and 4-tert-butylcyclohexane-1,2-dicarboxylic acid.

The alicyclic dicarboxylic acids represented by formula (1) may be used alone or in a combination of two or more.

The alicyclic dicarboxylic acid represented by formula (1) has a cis isomer in which $R^1$ and two carboxyl groups on the cyclohexane ring are all oriented in the same direction with respect to the plane of paper (an isomer in which the groups all have a cis configuration), and other stereoisomers. As long as the effects of the present invention are obtained, the present invention does not depend on the structure of the isomers. From the viewpoint of the effect of the present invention, it is desirable that the alicyclic dicarboxylic acid be rich in the cis isomer. For example, the ratio (mol %) of the cis isomer in the stereoisomers above is recommended to be 70 mol % or more, preferably 80 mol % or more, more preferably 90 mol % or more, still more preferably 95 mol % or more, and particularly 97 mol % or more.

The alicyclic dicarboxylic acid represented by formula (1) has two types of stereoisomers, which are a cis isomer in which the two carboxyl groups on the cyclohexane ring are oriented in the same direction with respect to the plane of paper (an isomer with cis configuration), and a trans isomer in which those groups are oriented in opposite directions (an isomer with trans configuration). As long as the effects of the present invention are obtained, the present invention does not depend on the structure of the isomers, and a cis isomer, a trans isomer, and a mixture thereof are all possible. From the viewpoint of the effect of the present invention, it is desirable that the alicyclic dicarboxylic acid be rich in the cis isomer. For example, the ratio (mol %) of the cis isomer in the stereoisomers above is recommended to be 70 mol % or more, preferably 80 mol % or more, more preferably 90 mol % or more, still more preferably 95 mol % or more, and particularly 97 mol % or more.

$R^2$ in formula (2) is a hydrogen atom or a $C_1$-$C_4$ linear or branched alkyl group. Specific examples include methyl, ethyl, n-propyl, isopropyl, n-butyl, isobutyl, sec-butyl, and tert-butyl. Among these, $R^2$ is preferably a hydrogen atom from a practical and performance standpoint (in terms of crystallinity-improving effect).

The substitution position of $R^2$ in formula (2) is position 3 or 4 of the cyclohexene ring. Substitution at either position is possible. A particularly preferred substitution position is appropriately selected according to the type of the alkyl group as the substituent and the type of the metal species that forms a metal salt.

The alicyclic dicarboxylic acid represented by formula (2) has two types of stereoisomers, which are a cis isomer in which the two carboxyl groups are oriented in the same direction with respect to the plane of paper (an isomer with cis configuration), and a trans isomer in which those groups are oriented in opposite directions (an isomer with trans configuration). As long as the effects of the present invention are obtained, the present invention does not depend on the structure of the isomers, and a cis isomer, a trans isomer, and a mixture thereof are all possible. From the viewpoint of the effect of the present invention, it is desirable that the alicyclic dicarboxylic acid be rich in the cis isomer. For example, the ratio (mol %) of the cis isomer in the stereoisomers above is recommended to be 70 mol % or more, preferably 80 mol % or more, more preferably 90 mol % or more, still more preferably 95 mol % or more, and particularly 97 mol % or more.

Specific embodiments of the alicyclic dicarboxylic acid represented by formula (2) include 4-cyclohexene-1,2-dicarboxylic acid, 3-methyl-4-cyclohexene-1,2-dicarboxylic acid, 3-ethyl-4-cyclohexene-1,2-dicarboxylic acid, 3-n-propyl-4-cyclohexene-1,2-dicarboxylic acid, 3-isopropyl-4-cyclohexene-1,2-dicarboxylic acid, 3-n-butyl-4-cyclohexene-1,2-dicarboxylic acid, 3-tert-butyl-4-cyclohexene-1,2-dicarboxylic acid, 3-isobutyl-4-cyclohexene-1,2-dicarboxylic acid, 4-methyl-4-cyclohexene-1,2-dicarboxylic acid, 4-ethyl-4-cyclohexene-1,2-dicarboxylic acid, 4-ethyl-4-cyclohexene-1,2-dicarboxylic acid, 4-n-propyl-4-cyclohexene-1,2-dicarboxylic acid, 4-isopropyl-4-cyclohexene-1,2-dicarboxylic acid, 4-n-butyl-4-cyclohexene-1,2-dicarboxylic acid, 4-tert-butyl-4-cyclohexene-1,2-dicarboxylic acid, and 4-isobutyl-4-cyclohexene-1,2-dicarboxylic acid. Among these, preferred embodiments include 4-cyclohexene-1,2-dicarboxylic acid and 3-methyl-4-cyclohexene-1,2-dicarboxylic acid. In particular, 4-cyclohexene-1,2-dicarboxylic acid is most recommended.

The alicyclic dicarboxylic acids represented by formula (2) may be used alone or in a combination of two or more.

Calcium-Containing Inorganic Filler

The modifying agent for polyolefin resins of the present invention is prepared by treating the surface of a calcium-containing inorganic filler with the alicyclic dicarboxylic acid described above, and has a structure in which a calcium salt of the alicyclic dicarboxylic acid adheres to (all or part of) the surface of the inorganic filler. The calcium-containing inorganic filler refers to an inorganic filler that contains calcium that can react with the alicyclic dicarboxylic acid and form a salt. The inorganic filler may be any inorganic filler that contains such calcium. Specific examples include calcium carbonate, calcium silicate, calcium titanate, and calcium sulfate. Among these, calcium carbonate or calcium silicate is most recommended from a practical standpoint.

The calcium-containing inorganic filler is preferably in a particle form. The particles may have any shape, such as a spherical, elliptical, columnar, or needle-like shape. From the viewpoint of the effects of the present invention, the particles preferably have a columnar or needle-like shape. The average particle size of the calcium-containing inorganic filler is usually 0.1 to 20 μm, preferably 0.5 to 15 μm, and more preferably 1 to 10 μm. The average particle size can be measured with a laser diffraction particle size distribution analyzer.

The modifying agent for polyolefin resins of the present invention, in which a calcium salt of the alicyclic dicarboxylic acid adheres to the surface of the particles of the calcium-containing inorganic filler as a core, has an absolutely excellent nucleating agent effect.

Surface Treatment of Calcium-Containing Inorganic Filler

In the present invention, the method of treating the surface of the calcium-containing inorganic filler with the alicyclic dicarboxylic acid may be any method as long as the effects of the present invention are achieved. For example, it is important that the method or conditions enable the alicyclic dicarboxylic acid to react with the calcium in the calcium-containing inorganic filler to form a calcium salt on the surface of the calcium-containing inorganic filler. Specific examples of such a method include a method comprising adding the particles of a calcium-containing inorganic filler to an aqueous solution of an alicyclic dicarboxylic acid, and performing heating (in particular, refluxing) and stirring until a calcium salt is formed on the surface of the particles. The resulting wet particles are usually dried under reduced pressure optionally with heating to thus prepare a modifying agent for polyolefin resins of the present invention.

The formation of a calcium salt on the surface-treated, calcium-containing inorganic filler thus obtained according to the above method can be easily confirmed by infrared spectroscopic analysis (IR analysis). Furthermore, the amount of the alicyclic dicarboxylic acid adhering to the surface of the calcium-containing inorganic filler as a result of the surface treatment, i.e., the amount of the alicyclic dicarboxylic acid that is consumed to form the calcium salt, can be confirmed by, for example, thermogravimetry and differential thermal analysis (TG/DTA).

The amount of the alicyclic dicarboxylic acid adhering to the surface of the calcium-containing inorganic filler as confirmed by the above method may be any amount as long as the amount is sufficient to achieve the effects of the present invention, and can be adjusted according to the types of the alicyclic dicarboxylic acid and calcium-containing inorganic filler. The amount is usually 0.2 mol or more, preferably 0.3 mol or more, and more preferably 0.4 mol or more, and the amount is usually 1.5 mol or less, preferably 1.0 mol or less, and more preferably 0.8 mol or less, per mole of the calcium contained in the calcium-containing inorganic filler. Within these ranges, the effects of the present invention can be more sufficiently achieved.

The modifying agent for polyolefin resins of the present invention comprising the surface-treated, calcium-containing inorganic filler is preferably in a particle form. The particles may have any shape, such as a spherical, elliptical, columnar, or needle-like shape. From the viewpoint of the effects of the present invention (e.g., excellent mechanical properties, such as rigidity), the particles preferably have a columnar or needle-like shape. The average particle size of the modifying agent for polyolefin resins is usually 0.1 to 20 μm, preferably 0.5 to 15 μm, and more preferably 1 to 10 μm. The average particle size can be measured with a laser diffraction particle size distribution analyzer.

2. Polyolefin Resin Composition

The polyolefin resin composition of the present invention comprises the modifying agent for polyolefin resins described above and a polyolefin resin. The polyolefin resin composition of the present invention may optionally comprise one or more other additives for polyolefin resins.

The content of the modifying agent for polyolefin resins in the polyolefin resin composition is not particularly limited as long as the effects of the present invention are achieved. The content is usually 3 to 40 parts by mass, preferably 5 to 30 parts by mass, more preferably 7 to 25 parts by mass, per 100 parts by mass of the polyolefin resin.

Polyolefin Resin

The polyolefin resin for use may be any polyolefin resin as long as the effects of the present invention are obtained, and may be a conventionally known polyolefin resin. Examples include polyethylene resins, polypropylene resins, polybutene resins, polymethylpentene resins, and polybutadiene resins. More specific examples include high-density polyethylene, medium-density polyethylene, linear polyethylene, ethylene copolymers having an ethylene content of 50 mass % or more (preferably 70 mass % or more), propylene homopolymers, propylene copolymers having a propylene content of 50 mass % or more (preferably 70 mass % or more), butene homopolymers, butene copolymers having a butene content of 50 mass % or more (preferably 70 mass % or more), methylpentene homopolymers, methylpentene copolymers having a methylpentene content of 50 mass % or more (preferably 70 mass % or more), and polybutadiene. These copolymers may be a random copolymer or a block copolymer. Of the above resins, the resins having tacticity may be isotactic or syndiotactic. Specific examples of comonomers that can constitute the copolymers include $C_2$-$C_{12}$ α-olefins, such as ethylene, propylene, butene, pentene, hexene, heptene, octene, nonene, decene, undecene, and dodecene; bicyclo monomers, such as 1,4-endomethylenecyclohexene; (meth)acrylic acid esters, such as methyl (meth)acrylate and ethyl (meth)acrylate; and vinyl acetate.

Examples of catalysts used for production of the polymer include commonly used Ziegler-Natta catalysts, as well as catalyst systems obtained by combining a catalyst in which a transition metal compound (e.g., titanium halides, such as titanium trichloride and titanium tetrachloride) is supported on a carrier mainly containing a magnesium halide (e.g., magnesium chloride) with an alkyl aluminum compound (e.g., triethyl aluminum, diethyl aluminum chloride). Examples of catalysts also include metallocene catalysts.

The melt flow rate (abbreviated below as "MER") of the polyolefin resin according to the present invention is a value measured in accordance with JIS K 7210-1999. The MFR is appropriately selected according to the molding method used. The MER is usually recommended to be about 0.01 to 200 g/10 min, and preferably about 0.05 to 100 g/10 min.

Other Additives

As described above, the polyolefin resin composition of the present invention may comprise one or more other additives for polyolefin resins according to the intended use or its application as long as the effects of the present invention are not impaired.

Examples of the additives for polyolefin resins include various additives listed in "The Tables of Positive Lists of Additives" edited by Japan Hygienic Olefin and Styrene Plastics Association (September 2004). Specific examples include fluorescent brighteners (e.g., 2,5-thiophene diyl(5-t-butyl-1,3-benzoxazole) and 4,4'-bis(benzoxazol-2-yl) stilbene), antioxidants, stabilizers (e.g., metal compounds, epoxy compounds, nitrogen compounds, phosphorus compounds, and sulfur compounds), ultraviolet absorbers (e.g., benzophenone compounds and benzotriazole compounds), surfactants, lubricants (e.g., aliphatic hydrocarbons, such as paraffin and wax, $C_8$-$C_{22}$ higher fatty acids, $C_8$-$C_{22}$ higher fatty acid metal (such as Al, Ca) salts, $C_8$-$C_{22}$ higher aliphatic alcohols, polyglycol, esters of $C_4$-$C_{22}$ higher fatty acids and $C_4$-$C_{18}$ aliphatic monohydric alcohols, $C_8$-$C_{22}$ higher fatty acid amides, silicone oil, and rosin derivatives), fillers other than those used in the present invention (e.g., talc, hydrotalcite, mica, zeolite, perlite, diatom earth, and glass fiber), foaming agents, foaming aids, polymer additives, plasticizers (e.g., dialkylphthalate and dialkylhexahydrophthalate), crosslinking agents, crosslinking accelerators, antistatic agents, flame retardants, dispersants, organic and inorganic pigments (e.g., indigo compounds, phthalocyanine compounds, anthraquinone compounds, ultramarine compounds, and cobalt aluminate compounds), processing aids, and other nucleating agents.

The amount of these additives when used may be within a usual range as long as the effects of the present invention are not impaired. For example, the amount is commonly preferably about 0.0001 to 100 parts by mass, and more preferably about 0.001 to 50 parts by mass, per 100 parts by mass of the polyolefin resin.

Examples of the antioxidant include phenolic antioxidants, phosphorous acid ester antioxidants, and sulfur antioxidants. Specific examples of the antioxidants include phenolic antioxidants, such as 2,6-di-tert-butylphenol, tetrakis[methylene-3-(3,5-di-tert-butyl-4-hydroxyphenyl)propionate]methane, and 2-hydroxy-4-methoxybenzophenone; sulfur antioxidants, such as alkyl disulfide, thiodipropionic acid ester, and benzothiazole; and phosphorous acid ester antioxidants, such as tris(nonylphenyl) phosphite, diphenyl isodecyl phosphite, triphenyl phosphite, tris(2,4-di-tert-butylphenyl)phosphite, and 3,9-bis(2,6-di-tert-butyl-4-methylphenoxy)-2,4,8,10-tetraoxa-3,9-diphosphaspiro[5,5] undecane. Among these, particularly recommended are tetrakis[methylene-3-(3,5-di-t-butyl-4-hydroxyphenyl)propionate]methane, which is a phenolic antioxidant, and tris (2,4-di-tert-butylphenyl)phosphite and 3,9-bis(2,6-di-tert-butyl-4-methylphenoxy)-2,4,8,10-tetraoxa-3,9-diphosphaspiro[5,5]undecane, which are phosphorous acid ester antioxidants.

The polyolefin resin composition of the present invention can be prepared by blending the modifying agent for polyolefin resins described above and optionally one or more other additives with a polyolefin resin, and dry-blending the mixture, followed by melting and mixing.

3. Polyolefin Resin Molded Article

The polyolefin resin molded article of the present invention can be obtained by molding the polyolefin resin composition described above in accordance with a conventional molding method. The molding method may be any method as long as the effects of the present invention are obtained. The molding method may be any known molding method, such as injection molding, extrusion molding, blow molding, air-pressure molding, rotational molding, and film molding.

The polyolefin resin molded article thus obtained has absolutely excellent mechanical performance, such as rigidity, and thermal performance, such as heat distortion temperature, and can thus meet increasingly stringent requirements for the performance of polyolefin resin molded articles for use in automotive components, electrical components, etc. Additionally, the use of general-purpose polyolefin resins with excellent recyclability is made possible even in applications in which it has been difficult to use a polyolefin resin due to its performance.

EXAMPLES

The present invention is described in more detail below with reference to Examples. However, the present invention is not limited to these Examples. The abbreviations of compounds and measurement methods of each property used in the Examples are as described below.

Analytical Methods for Calcium-Containing Inorganic Filler and Modifying Agent for Polyolefin Resins (1) Infrared Spectroscopic Analysis (IR Analysis)

FT-IR spectrometer: trade name, Spectrum One, produced by PerkinElmer, measurement range: 650 to 4000 $cm^{-1}$, measurement method: ATR method, cumulative number: 3, resolution: 4.00 $cm^{-1}$ The measurement was performed by pressing the sample onto the cell of the spectrometer.

(2) Thermogravimetry and Differential Thermal Analysis (TG/DTA)

The sample was placed in a TG-DTA device (device name: EXSTAR 6000 series, TG/DTA 6200, produced by SII NanoTechnology Inc.), and the measurement was performed under the following measurement conditions.

Measurement Conditions

Temperature increase rate: 10° C./min

Circulated nitrogen amount: 200 ml/min

Measurement start temperature: 50° C.

Measurement end temperature: 550° C.

(3) Measurement of Average Particle Size

The average particle size of calcium-containing inorganic fillers (calcium silicate and calcium carbonate) and modifying agents for polyolefin resins was measured under dry conditions with a laser diffraction particle size distribution analyzer (Mastersizer 3000, produced by Malvern Instruments Ltd.) with a dry dispersion unit (AeroS, produced by Malvern Instruments Ltd.). The particle diameter at 50% in the volume-based cumulative distribution (median diameter: $d_{50}$) was determined based on a particle size distribution obtained by measurement under conditions of a feed rate of 12 mes-2 (display: 20%) and dispersion pressure of 1 bar, and the resulting value was defined as the average particle size.

(4) Shape Observation Method

The shape of calcium-containing inorganic fillers and modifying agents for polyolefin resins was observed with a scanning electron microscope (S-3400N, produced by Hitachi High-Tech Corporation) at an acceleration voltage of 15 kV.

Evaluation Method for Polyolefin Resin Molded Article (5) Crystallization Temperature The crystallization temperature was measured in accordance with JIS K7121 (1987) using a differential scanning calorimeter (DSC8500, produced by PerkinElmer). About 6 mg each of the polyolefin resin compositions of the Examples and Comparative Examples was used as the evaluation sample. The sample was set on the apparatus, maintained at 200° C. for 3 minutes, and then cooled at a cooling rate of 10° C./min. The top of the endothermic peak was defined as the crystallization temperature (° C.).

(6) Flexural Modulus and Bending Strength

The flexural modulus and bending strength were measured by a method in accordance with JIS K7171 (2016) using a universal material tester (produced by Instron). The test temperature was 25° C., and the test speed was 10 mm/min.

(7) Temperature of Deflection Under Load

The temperature of deflection under load was measured by a method in accordance with JIS K7191 (2015) using an HDT test apparatus (model: 3M-2, produced by Toyo Seiki Seisaku-sho, Ltd.).

Production Example 1

Fifty grams of 4-methylcyclohexane-1,2-dicarboxylic acid (abbreviated below as "4MH," ratio of cis isomer: 95%), 100 g of calcium silicate (abbreviated below as "$CaSiO_3$," product name: KGP-H45, columnar particles with an average particle size of 4.6 μm, produced by Kansai Matec Co., Ltd.), and 3000 g of water were placed in a vessel equipped with a stirrer and a cooling tube, and the mixture was stirred for 2 hours under reflux. After the stirring was stopped, wet particles were obtained by filtration. The obtained wet particles were dried at 150° C. for 10 hours under reduced pressure to obtain 120 g of white powder. IR analysis confirmed that the obtained white powder was the target product, i.e., $CaSiO_3$ whose surface was treated with 4MH (modifying agent 1). Furthermore, the amount of 4MH adhering to modifying agent 1 was confirmed by TG-DTA to be 0.20 mol per mole of the calcium contained in the $CaSiO_3$ used. The obtained modifying agent 1 had an average particle size of 4.6 μm (columnar particles).

Production Example 2

A white powder (90 g) was obtained in the same manner as in Production Example 1, except that the amount of 4MH was changed to 100 g, and the amount of $CaSiO_3$ was changed to 50 g. IR analysis confirmed that the obtained white powder was the target product, i.e., $CaSiO_3$ whose surface was treated with 4MH (modifying agent 2). Furthermore, the amount of 4MH adhering to modifying agent 2 was confirmed by TG-DTA to be 0.46 mol per mole of the calcium contained in the $CaSiO_3$ used. The obtained modifying agent 2 had an average particle size of 4.9 μm (columnar particles).

Production Example 3

A white powder (125 g) was obtained in the same manner as in Production Example 1, except that 4-t-butylcyclohexane-1,2-dicarboxylic acid (abbreviated below as "4tBH," ratio of cis isomer: 100%) was used instead of 4MH. IR analysis confirmed that the obtained white powder was the target product, i.e., calcium silicate whose surface was treated with 4tBH (modifying agent 3). Furthermore, the amount of 4tBH adhering to modifying agent 3 was confirmed by TG-DTA to be 0.21 mol per mole of the calcium contained in the $CaSiO_3$ used. The obtained modifying agent 3 had an average particle size of 4.7 μm (columnar particles).

Production Example 4

A white powder (92 g) was obtained in the same manner as in Production Example 2, except that 4tBH was used instead of 4MH. IR analysis confirmed that the obtained white powder was the target product, i.e., $CaSiO_3$ whose surface was treated with 4tBH (modifying agent 4). Furthermore, the amount of 4tBH adhering to modifying agent 4 was confirmed by TG-DTA to be 0.45 mol per mole of the calcium contained in the $CaSiO_3$ used. The obtained modifying agent 4 had an average particle size of 4.8 μm (columnar particles).

Production Example 5

A white powder (107 g) was obtained in the same manner as in Production Example 1, except that calcium carbonate (abbreviated below as "$CaCO_3$," reagent, irregular-shaped particles with an average particle size of 7.4 μm, produced by FUJIFILM Wako Pure Chemical Corporation) was used instead of $CaSiO_3$. IR analysis confirmed that the obtained white powder was the target product, i.e., $CaCO_3$ whose surface was treated with 4MH (modifying agent 5). Furthermore, the amount of 4MH adhering to modifying agent 5 was confirmed by TG-DTA to be 0.35 mol per mole of the calcium contained in the $CaCO_3$ used. The obtained modifying agent 5 had an average particle size of 7.6 μm (irregular-shaped particles).

Production Example 6

A white powder (98 g) was obtained in the same manner as in Production Example 2, except that $CaCO_3$ was used instead of $CaSiO_3$. IR analysis confirmed that the obtained white powder was the target product, i.e., $CaCO_3$ whose surface was treated with 4MH (modifying agent 6). Furthermore, the amount of 4MH adhering to modifying agent 6 was confirmed by TG-DTA to be 0.66 mol per mole 10 of the calcium contained in the $CaCO_3$ used. The obtained modifying agent 6 had an average particle size of 7.8 μm (irregular-shaped particles).

Production Example 7

A white powder (100 g) was obtained in the same manner as in Production Example 3, except that $CaCO_3$ was used instead of $CaSiO_3$. IR analysis confirmed that the obtained white powder was the target product, i.e., $CaCO_3$ whose surface was treated with 4tBH (modifying agent 7). Furthermore, the amount of 4tBH adhering to modifying agent 7 was confirmed by TG-DTA to be 0.32 mol per mole of the calcium contained in the $CaCO_3$ used. The obtained modifying agent 7 had an average particle size of 7.9 μm (irregular-shaped particles).

Production Example 8

A white powder (95 g) was obtained in the same manner as in Production Example 4, except that $CaCO_3$ was used instead of $CaSiO_3$. IR analysis confirmed that the obtained white powder was the target product, i.e., $CaCO_3$ whose surface was treated with 4tBH (modifying agent 8). Furthermore, the amount of 4tBH adhering to modifying agent 8 was confirmed by TG-DTA to be 0.63 mol per mole of the calcium contained in the $CaCO_3$ used. The obtained modifying agent 8 had an average particle size of 7.9 μm (irregular-shaped particles).

Example 1

Modifying agent 1 (5 parts by mass), as well as other additives, which were 0.05 parts by mass of calcium stearate (produced by Nitto Kasei Kogyo K.K.), 0.05 parts by mass of tetrakis[methylene-3-(3,5-di-tert-butyl-4-hydroxyphenyl) propionate]methane (product name: Irganox 1010, produced by BASF Japan Ltd.), and 0.05 parts by mass of tris(2,4-di-tert-butylphenyl)phosphite (product name: Irgafos 168, produced by BASF Japan Ltd.), were added to 100 parts by mass of a polypropylene homopolymer (MFR: 9 g/10 min (load: 2160 g, temperature: 230° C.)), and the mixture was dry-blended. The obtained dry-blended product was melted and mixed using a twin-screw extruder (produced by Technovel Corporation, L/D=45, screw diameter: 15 mm, die diameter: 5 mm) at a barrel temperature of 200° C. The extruded strand was then cooled and cut with a pelletizer to prepare a polyolefin resin composition. The crystallization temperature of the obtained polyolefin resin composition was measured. Table 1 shows the results.

Subsequently, the obtained polyolefin resin composition was molded under the conditions of an injection molding temperature (heating temperature) of 200° C. and a mold temperature (cooling temperature) of 40° C. using an injection molding machine (NS40-5A, produced by Nissei Plastic Industrial Co., Ltd.) to produce a polyolefin resin molded article of the present invention (test piece). The flexural modulus, bending strength, and temperature of deflection under load of the obtained test piece were measured. Table 1 shows the results.

Example 2

A polyolefin resin composition was prepared in the same manner as in Example 1, except that the amount of modifying agent 1 was changed from 5 parts by mass to 10 parts by mass. The crystallization temperature of the obtained polyolefin resin composition was measured. Table 1 shows the results.

Subsequently, a polyolefin resin molded article of the present invention (test piece) was obtained in the same manner as in Example 1 by using the obtained polyolefin resin composition. The flexural modulus, bending strength, and temperature of deflection under load of the obtained test piece were measured. Table 1 shows the results.

Example 3

A polyolefin resin composition was prepared in the same manner as in Example 1, except that modifying agent 2 was used instead of modifying agent 1. The crystallization temperature of the obtained polyolefin resin composition was measured. Table 1 shows the results.

Subsequently, a polyolefin resin molded article of the present invention (test piece) was obtained in the same manner as in Example 1 by using the obtained polyolefin resin composition. The flexural modulus, bending strength, and temperature of deflection under load of the obtained test piece were measured. Table 1 shows the results.

Example 4

A polyolefin resin composition was prepared in the same manner as in Example 2, except that modifying agent 2 was used instead of modifying agent 1. The crystallization temperature of the obtained polyolefin resin composition was measured. Table 1 shows the results.

Subsequently, a polyolefin resin molded article of the present invention (test piece) was obtained in the same manner as in Example 2 by using the obtained polyolefin resin composition. The flexural modulus, bending strength, and temperature of deflection under load of the obtained test piece were measured. Table 1 shows the results.

Example 5

A polyolefin resin composition was prepared in the same manner as in Example 1, except that modifying agent 3 was used instead of modifying agent 1. The crystallization temperature of the obtained polyolefin resin composition was measured. Table 1 shows the results.

Subsequently, a polyolefin resin molded article of the present invention (test piece) was obtained in the same manner as in Example 1 by using the obtained polyolefin resin composition. The flexural modulus, bending strength, and temperature of deflection under load of the obtained test piece were measured. Table 1 shows the results.

Example 6

A polyolefin resin composition was prepared in the same manner as in Example 2, except that modifying agent 3 was used instead of modifying agent 1. The crystallization temperature of the obtained polyolefin resin composition was measured. Table 1 shows the results.

Subsequently, a polyolefin resin molded article of the present invention (test piece) was obtained in the same manner as in Example 2 by using the obtained polyolefin resin composition. The flexural modulus, bending strength, and temperature of deflection under load of the obtained test piece were measured. Table 1 shows the results.

Example 7

A polyolefin resin composition was prepared in the same manner as in Example 1, except that modifying agent 4 was used instead of modifying agent 1. The crystallization temperature of the obtained polyolefin resin composition was measured. Table 1 shows the results.

Subsequently, a polyolefin resin molded article of the present invention (test piece) was obtained in the same manner as in Example 1 by using the obtained polyolefin resin composition. The flexural modulus, bending strength, and temperature of deflection under load of the obtained test piece were measured. Table 1 shows the results.

Example 8

A polyolefin resin composition was prepared in the same manner as in Example 2, except that modifying agent 4 was used instead of modifying agent 1. The crystallization temperature of the obtained polyolefin resin composition was measured. Table 1 shows the results.

Subsequently, a polyolefin resin molded article of the present invention (test piece) was obtained in the same manner as in Example 2 by using the obtained polyolefin resin composition. The flexural modulus, bending strength, and temperature of deflection under load of the obtained test piece were measured. Table 1 shows the results.

TABLE 1

| | | | Example | | | | | | | |
|---|---|---|---|---|---|---|---|---|---|---|
| | | | 1 | 2 | 3 | 4 | 5 | 6 | 7 | 8 |
| Modifying | Type | | Modifying agent 1 | | Modifying agent 2 | | Modifying agent 3 | | Modifying agent 4 | |
| agent | Amount | Parts by mass | 5 | 10 | 5 | 10 | 5 | 10 | 5 | 10 |
| Crystallization temperature | ° C. | | 132.7 | 132.8 | 133.8 | 134.5 | 133.5 | 133.7 | 132.8 | 134.6 |
| Flexural modulus | MPa | | 1830 | 2070 | 1850 | 2130 | 1820 | 2080 | 1850 | 2160 |
| Bending strength | MPa | | 49.9 | 51.1 | 50.2 | 52.3 | 50.0 | 51.1 | 51.1 | 53.4 |
| Temperature of deflection under load | ° C. | | 118 | 129 | 120 | 131 | 119 | 128 | 121 | 131 |

Example 9

A polyolefin resin composition was prepared in the same manner as in Example 2, except that modifying agent 5 was used instead of modifying agent 1. The crystallization temperature of the obtained polyolefin resin composition was measured. Table 2 shows the results.

Subsequently, a polyolefin resin molded article of the present invention (test piece) was obtained in the same manner as in Example 2 by using the obtained polyolefin resin composition. The flexural modulus, bending strength, and temperature of deflection under load of the obtained test piece were measured. Table 2 shows the results.

Example 10

A polyolefin resin composition was prepared in the same manner as in Example 9, except that the amount of modifying agent 5 was changed from 10 parts by mass to 20 parts by mass. The crystallization temperature of the obtained polyolefin resin composition was measured. Table 2 shows the results.

Subsequently, a polyolefin resin molded article of the present invention (test piece) was obtained in the same manner as in Example 9 by using the obtained polyolefin resin composition. The flexural modulus, bending strength, and temperature of deflection under load of the obtained test piece were measured. Table 2 shows the results.

Example 11

A polyolefin resin composition was prepared in the same manner as in Example 9, except that modifying agent 6 was used instead of modifying agent 5. The crystallization temperature of the obtained polyolefin resin composition was measured. Table 2 shows the results.

Subsequently, a polyolefin resin molded article of the present invention (test piece) was obtained in the same manner as in Example 9 by using the obtained polyolefin resin composition. The flexural modulus, bending strength, and temperature of deflection under load of the obtained test piece were measured. Table 2 shows the results.

Example 12

A polyolefin resin composition was prepared in the same manner as in Example 10, except that modifying agent 6 was used instead of modifying agent 5. The crystallization temperature of the obtained polyolefin resin composition was measured. Table 2 shows the results.

Subsequently, a polyolefin resin molded article of the present invention (test piece) was obtained in the same manner as in Example 10 by using the obtained polyolefin resin composition. The flexural modulus, bending strength, and temperature of deflection under load of the obtained test piece were measured. Table 2 shows the results.

Example 13

A polyolefin resin composition was prepared in the same manner as in Example 9, except that modifying agent 7 was used instead of modifying agent 5. The crystallization temperature of the obtained polyolefin resin composition was measured. Table 2 shows the results.

Subsequently, a polyolefin resin molded article of the present invention (test piece) was obtained in the same manner as in Example 9 by using the obtained polyolefin resin composition. The flexural modulus, bending strength, and temperature of deflection under load of the obtained test piece were measured. Table 2 shows the results.

Example 14

A polyolefin resin composition was prepared in the same manner as in Example 10, except that modifying agent 7 was used instead of modifying agent 5. The crystallization temperature of the obtained polyolefin resin composition was measured. Table 2 shows the results.

Subsequently, a polyolefin resin molded article of the present invention (test piece) was obtained in the same manner as in Example 10 by using the obtained polyolefin resin composition. The flexural modulus, bending strength, and temperature of deflection under load of the obtained test piece were measured. Table 2 shows the results.

Example 15

A polyolefin resin composition was prepared in the same manner as in Example 9, except that modifying agent 8 was used instead of modifying agent 5. The crystallization temperature of the obtained polyolefin resin composition was measured. Table 2 shows the results.

Subsequently, a polyolefin resin molded article of the present invention (test piece) was obtained in the same manner as in Example 9 by using the obtained polyolefin resin composition. The flexural modulus, bending strength, and temperature of deflection under load of the obtained test piece were measured. Table 2 shows the results.

Example 16

A polyolefin resin composition was prepared in the same manner as in Example 10, except that modifying agent 8 was used instead of modifying agent 5. The crystallization temperature of the obtained polyolefin resin composition was measured. Table 2 shows the results.

Subsequently, a polyolefin resin molded article of the present invention (test piece) was obtained in the same manner as in Example 10 by using the obtained polyolefin resin composition. The flexural modulus, bending strength, and temperature of deflection under load of the obtained test piece were measured. Table 2 shows the results.

TABLE 2

| | | | Example | | | | | | | |
|---|---|---|---|---|---|---|---|---|---|---|
| | | | 9 | 10 | 11 | 12 | 13 | 14 | 15 | 16 |
| Modifying agent | | Type | Modifying agent 5 | | Modifying agent 6 | | Modifying agent 7 | | Modifying agent 8 | |
| | Amount | Parts by mass | 10 | 20 | 10 | 20 | 10 | 20 | 10 | 20 |
| Crystallization temperature | | ° C. | 133.1 | 133.1 | 134.1 | 134.9 | 133.3 | 133.8 | 134.5 | 135 |
| Flexural modulus | | MPa | 1770 | 1880 | 1810 | 1930 | 1770 | 1890 | 1830 | 1930 |
| Bending strength | | MPa | 50.2 | 53.9 | 50.9 | 55.1 | 49.9 | 54.0 | 50.8 | 55.1 |
| Temperature of deflection under load | | ° C. | 122 | 135 | 124 | 137 | 121 | 136 | 124 | 137 |

Comparative Example 1

A polyolefin resin composition was prepared in the same manner as in Example 1, except that $CaSiO_3$ without surface treatment was used instead of modifying agent 1. The crystallization temperature of the obtained polyolefin resin composition was measured. Table 3 shows the results.

Subsequently, a polyolefin resin molded article of the present invention (test piece) was obtained in the same manner as in Example 1 by using the obtained polyolefin resin composition. The flexural modulus, bending strength, and temperature of deflection under load of the obtained test piece were measured. Table 3 shows the results.

Comparative Example 2

A polyolefin resin composition was prepared in the same manner as in Example 2, except that $CaSiO_3$ without surface treatment was used instead of modifying agent 1. The crystallization temperature of the obtained polyolefin resin composition was measured. Table 3 shows the results.

Subsequently, a polyolefin resin molded article of the present invention (test piece) was obtained in the same manner as in Example 2 by using the obtained polyolefin resin composition. The flexural modulus, bending strength, and temperature of deflection under load of the obtained test piece were measured. Table 3 shows the results.

Comparative Example 3

A polyolefin resin composition was prepared in the same manner as in Comparative Example 1, except that the amount of $CaSiO_3$ without surface treatment was changed from 5 parts by mass to 20 parts by mass. The crystallization temperature of the obtained polyolefin resin composition was measured. Table 3 shows the results.

Subsequently, a polyolefin resin molded article of the present invention (test piece) was obtained in the same manner as in Example 1 by using the obtained polyolefin resin composition. The flexural modulus, bending strength, and temperature of deflection under load of the obtained test piece were measured. Table 3 shows the results.

Comparative Example 4

A polyolefin resin composition was prepared in the same manner as in Example 9, except that $CaCO_3$ without surface treatment was used instead of modifying agent 5. The crystallization temperature of the obtained polyolefin resin composition was measured. Table 3 shows the results.

Subsequently, a polyolefin resin molded article of the present invention (test piece) was obtained in the same manner as in Example 9 by using the obtained polyolefin resin composition. The flexural modulus, bending strength, and temperature of deflection under load of the obtained test piece were measured. Table 3 shows the results.

Comparative Example 5

A polyolefin resin composition was prepared in the same manner as in Example 10, except that $CaCO_3$ without surface treatment was used instead of modifying agent 5. The crystallization temperature of the obtained polyolefin resin composition was measured. Table 3 shows the results.

Subsequently, a polyolefin resin molded article of the present invention (test piece) was obtained in the same manner as in Example 10 by using the obtained polyolefin resin composition. The flexural modulus, bending strength, and temperature of deflection under load of the obtained test piece were measured. Table 3 shows the results.

Comparative Example 6

A polyolefin resin composition was prepared in the same manner as in Example 1 without using a filler. The crystallization temperature of the obtained polyolefin resin composition was measured. Table 3 shows the results.

Subsequently, a polyolefin resin molded article of the present invention (test piece) was obtained in the same manner as in Example 1 by using the obtained polyolefin resin composition. The flexural modulus, bending strength, and temperature of deflection under load of the obtained test piece were measured. Table 3 shows the results.

TABLE 3

| | | | Comparative Example | | | | | |
|---|---|---|---|---|---|---|---|---|
| | | | 1 | 2 | 3 | 4 | 5 | 6 |
| Inorganic | Type | | Untreated $CaSiCO_3$ | | | Untreated $CaCO_3$ | | — |
| filler | Amount | Parts by mass | 5 | 10 | 20 | 10 | 20 | — |
| Crystallization temperature | | ° C. | 125.1 | 125.6 | 126.1 | 123.6 | 123.6 | 123.5 |
| Flexural modulus | | MPa | 1610 | 1720 | 1760 | 1640 | 1680 | 1360 |
| Bending strength | | MPa | 48.7 | 50.3 | 51.1 | 49.8 | 50.1 | 432 |
| Temperature of deflection under load | | ° C. | 109 | 121 | 123 | 120 | 120 | 100 |

A comparison of the results of the crystallization temperature of Examples 1 to 8 in Table 1 with the results of the crystallization temperature of Comparative Examples 1 and 2 in Table 3 reveals that the modifying agents according to the present invention in which the calcium-containing inorganic filler had been subjected to a surface treatment had a remarkably improved nucleating agent effect of the inorganic filler. Further, a comparison of the results of flexural modulus and bending strength, which are mechanical performance, and the results of temperature of deflection under load, which is thermal performance, reveals that the polyolefin resin molded products according to the present invention had greatly improved mechanical and thermal performance.

Furthermore, a comparison of the results of the Examples in Table 1 with the results of Comparative Example 3 in Table 3 reveals that although the inorganic filler was used in the Examples in an amount much smaller than that used in Comparative Example 3, the effects achieved in the Examples were equal to or better than those achieved in Comparative Example 3. These results are very useful in terms of weight reduction etc. for automotive components etc.

The same trend was also confirmed in a comparison of the results of the Examples in Table 2 with the results of Comparative Examples 4 and 5 in Table 3, indicating that the effects of the surface treatment according to the present invention applies to all calcium-containing inorganic fillers.

INDUSTRIAL APPLICABILITY

The modifying agent according to the present invention is obtained by treating the surface of a calcium-containing inorganic filler with a specific alicyclic dicarboxylic acid, and thus achieves a far better nucleating agent effect than that of the inorganic filler. Therefore, the modifying agent, when blended with a polyolefin resin, greatly improves the mechanical performance, such as rigidity, and thermal performance, such as heat distortion temperature, of the resulting molded products. The weight of these molded products can be reduced by making the product thinner in applications for automotive components, electrical components, etc. Further, even in applications in which the use of polyolefin resins has so far been difficult due to their performance, and other resins, such as expensive ABS, would thus be inevitably used, the use of a general-purpose polyolefin resin, which is inexpensive and has excellent recyclability, is made possible in place of those other resins. Accordingly, the present invention will be very useful in developing molded products for a variety of purposes in the future.

The invention claimed is:

1. A modifying agent for polyolefin resins, comprising a calcium-containing inorganic filler whose particle surface is treated with an alicyclic dicarboxylic acid represented by formula (1) and/or formula (2):

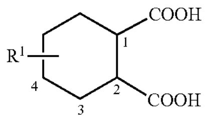

(1)

wherein $R^1$ is a methyl group or a tert-butyl group, and $R^1$ binds to the carbon at position 3 or 4 of a cyclohexane ring; and

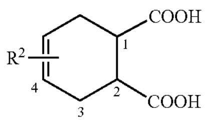

(2)

wherein $R^2$ is a hydrogen atom or a $C_1$-$C_4$ alkyl group, and $R^2$ binds to the carbon at position 3 or 4 of a cyclohexene ring, and wherein the amount of the alicyclic dicarboxylic acid adhering to the surface of the particles of the calcium-containing inorganic filler is 0.2 to 0.8 mol per mole of the calcium contained in the modifying agent for polyolefin resins.

2. The modifying agent for polyolefin resins according to claim 1, wherein the calcium-containing inorganic filler is at least one member selected from the group consisting of calcium carbonate, calcium silicate, calcium titanate, and calcium sulfate.

3. The modifying agent for polyolefin resins according to claim 1, wherein the calcium-containing inorganic filler is calcium silicate.

4. The modifying agent for polyolefin resins according to claim 1, wherein the calcium-containing inorganic filler has an average particle size of 0.1 to 20 μm.

5. The modifying agent for polyolefin resins according to claim 1, wherein in formula (1), the content of an isomer in which $R^1$ and two oxycarbonyl groups on the cyclohexane ring all have a cis configuration is 70 mol % or more of total stereoisomers.

6. The modifying agent for polyolefin resins according to claim 1, wherein in formula (2), two carboxyl groups on the cyclohexene ring have a cis configuration.

7. The modifying agent for polyolefin resins according to claim 1, wherein the alicyclic dicarboxylic acid is an alicyclic dicarboxylic acid represented by formula (1).

8. A polyolefin resin composition comprising the modifying agent for polyolefin resins of claim 1 and a polyolefin resin.

9. The polyolefin resin composition according to claim 8, comprising the modifying agent for polyolefin resins in an amount of 3 to 40 parts by mass per 100 parts by mass of the polyolefin resin.

10. A polyolefin resin molded article comprising the polyolefin resin composition of claim 8.

11. A method for producing the modifying agent for polyolefin resins of claim 1, the method comprising treating the surface of particles of a calcium-containing inorganic filler with an alicyclic dicarboxylic acid represented by formula (1) and/or formula (2).

12. A method for producing the polyolefin resin composition of claim 8, the method comprising treating the surface of particles of a calcium-containing inorganic filler with an alicyclic dicarboxylic acid represented by formula (1) and/or formula (2) to obtain a modifying agent for polyolefin resins, and blending the obtained modifying agent for polyolefin resins with a polyolefin resin.

* * * * *